(12) United States Patent
Burke

(10) Patent No.: US 8,549,973 B2
(45) Date of Patent: Oct. 8, 2013

(54) ROTATING BLADE ARBOR HOLE

(75) Inventor: Michael Patrick Burke, Sutton, MA (US)

(73) Assignee: Michael Patrick Burke, Sutton, MA (US)

( * ) Notice: Subject to any disclaimer, the term of this patent is extended or adjusted under 35 U.S.C. 154(b) by 0 days.

(21) Appl. No.: 11/491,620

(22) Filed: Jul. 24, 2006

(65) Prior Publication Data
US 2008/0017006 A1 Jan. 24, 2008

(51) Int. Cl.
*B23D 61/02* (2006.01)

(52) U.S. Cl.
USPC .......................... 83/665; 83/676; 83/698.41

(58) Field of Classification Search
USPC ............... 83/665, 666, 698.14, 676, 698.41;
125/15; 76/112; 82/1.4, 167; 30/DIG. 5;
56/320.1, 12.5–12.7, DIG. 24; 279/107,
279/6, 158; 403/1, 3, 4
See application file for complete search history.

(56) References Cited

U.S. PATENT DOCUMENTS

| | | |
|---|---|---|
| 158,617 A | 1/1875 | Bannister |
| 367,211 A | 7/1887 | Kimball |
| 1,077,572 A | 11/1913 | Welch |
| 1,130,914 A | 3/1915 | Maker |
| 1,314,125 A | 8/1919 | Burlew |
| 1,756,259 A | 11/1926 | Perks |
| 1,709,820 A | 3/1927 | Gammeter |
| 1,944,489 A | 7/1932 | Bookshe |
| 1,947,662 A * | 2/1934 | Robinson ...................... 451/342 |
| 2,259,554 A | 10/1941 | Clark |
| 2,572,042 A * | 10/1951 | Martin ........................ 451/342 |
| 2,649,868 A * | 8/1953 | Gommel ....................... 83/665 |
| 2,822,648 A | 2/1958 | Metzger et al. |
| 2,822,649 A * | 2/1958 | Bruderick .................... 451/396 |
| 2,831,514 A | 4/1958 | Avard |
| 2,912,021 A * | 11/1959 | Gommel ....................... 83/665 |
| 2,997,819 A | 8/1961 | Schacht |
| 3,440,915 A * | 4/1969 | Weyant ........................ 83/666 |
| 3,869,795 A | 3/1975 | Treace |
| 4,267,814 A | 5/1981 | Benson et al. |
| 4,454,901 A | 6/1984 | Thorsness |
| 4,456,303 A | 6/1984 | Due |
| 4,730,952 A * | 3/1988 | Wiley ......................... 403/316 |
| 4,928,662 A | 5/1990 | Chiuminatta et al. |
| 5,303,688 A | 4/1994 | Chiuminatta et al. |
| 5,373,834 A | 12/1994 | Chiuminatta et al. |
| 5,477,845 A * | 12/1995 | Zuzelo ......................... 125/15 |
| 5,603,310 A | 2/1997 | Chiuminatta et al. |
| 5,660,161 A | 8/1997 | Chiuminatta et al. |
| 5,697,835 A * | 12/1997 | Nitz et al. ..................... 451/548 |
| 5,901,629 A * | 5/1999 | Stroud ......................... 83/665 |
| D417,598 S * | 12/1999 | Dibbern et al. ................. D8/70 |
| 6,159,089 A * | 12/2000 | Amin et al. ................... 451/548 |
| 6,470,772 B2 * | 10/2002 | Peisert et al. ................... 76/112 |
| 6,651,644 B1 * | 11/2003 | Zuzelo ......................... 125/15 |
| 7,013,784 B2 * | 3/2006 | Lowder et al. ................. 83/848 |

(Continued)

*Primary Examiner* — Stephen Choi
*Assistant Examiner* — Fernando Ayala
(74) *Attorney, Agent, or Firm* — Iandiorio Teska & Coleman, LLP

(57) ABSTRACT

A rotating blade for a cutting machine. The blade defines an arbor hole for an arbor typically having at least three sides. The preferred arbor hole includes first and second sides each of which conform to adjacent sides of the arbor, a short side joining the first and second sides, a third side connected to the first side, and a fourth side connecting the third side to the second side.

7 Claims, 4 Drawing Sheets

(56) References Cited

U.S. PATENT DOCUMENTS

| | | | |
|---|---|---|---|
| 7,287,310 B2 * | 10/2007 | Zuzelo | 29/557 |
| D559,638 S * | 1/2008 | Park | D8/20 |
| 7,444,914 B2 * | 11/2008 | Brach | 83/665 |
| 2004/0156188 A1 * | 8/2004 | Zuzelo | 362/102 |
| 2005/0011329 A1 * | 1/2005 | Briggs | 83/666 |
| 2010/0107845 A1 * | 5/2010 | Baron | 83/676 |

\* cited by examiner

ROTATING BLADE ARBOR HOLE

FIELD OF THE INVENTION

This subject invention relates to a rotating blade with an arbor hole useful for cutting machines.

BACKGROUND OF THE INVENTION

Devices with rotating blades such as concrete cutting saws include a blade mount or arbor received in the arbor hole of the blade. U.S. Pat. No. 5,603,310, incorporated herein by this reference, discloses a three-sided arbor and a corresponding blade arbor hole configured the same as the arbor. U.S. Pat. No. 6,651,644, also incorporated herein by this reference, discloses a blade arbor hole with a "cut gem" configuration designed to be attached to different types of arbor.

The applicant's prior blades had an arbor hole configured as a square with one corner cut-off. The arbor hole has four fairly long sides and one fairly short angled side. This design worked well for saws with a traditional three-sided arbor.

Recently, however, at least one saw manufacturer has changed the configuration of the three-sided arbor so that the applicant's blades cannot be properly secured to the arbor. Moreover, due to various patents covering different blade arbor hole configurations, users of saws have limited choices in selecting after market saw blades.

SUMMARY OF THE INVENTION

It is therefore an object of this invention to provide a new saw blade arbor hole that can be properly secured to a three-sided arbor of different configurations.

It is a further object of this invention to provide such a saw blade arbor hole that can be attached to different types of cutting machine arbors.

It is a further object of this invention to provide such a saw blade arbor hole that enables users of devices with rotating blades to purchase blades that can be used with a variety of different types of devices.

The subject invention results from the realization that a unique saw blade arbor hole typically used with three-sided arbors of different configurations preferably includes two adjacent sides each of which conforms to the adjacent sides of the blade mount, a short side which joins those two sides, a third side connecting one adjacent conforming side, and a fourth side connecting the third side to the other adjacent conforming side.

The subject invention, however, in other embodiments, need not achieve all these objectives and the claims hereof should not be limited to structures or methods capable of achieving these objectives.

This invention features a rotating blade for a cutting machine, the blade defining an arbor hole typically for an arbor having at least three sides. The preferred arbor hole includes first and second sides each of which conform to adjacent sides of the arbor and a short side joining the first and second sides. A third side is connected to the first side and a fourth side connecting the third side to the second side.

Typically, all the sides are straight and connected together by non-radiused corners. In one example, the first side is parallel to the fourth side, the short side is parallel to the third side, the first, second, and third sides are the same or approximately the same length, and the fourth side is at least twice as long as the short side. Typically, the first, second, and third sides are longer than the fourth side which is longer than the short side.

One saw blade arbor hole in accordance with this invention features first and second sides each of which conform to adjacent sides of an arbor, a third side connected to the first side, and a fourth side connecting the third side to the second side. Typically, a short side is included to join the first and second sides.

A saw blade arbor hole in accordance with this invention features first and second sides each of which conform to adjacent sides of an arbor, a short side connecting the first and second sides, and a third side connected to the first side. Typically, a fourth side is provided to connect the third side to the second side.

BRIEF DESCRIPTION OF THE DRAWINGS

Other objects, features and advantages will occur to those skilled in the art from the following description of a preferred embodiment and the accompanying drawings, in which.

DISCLOSURE OF THE PREFERRED EMBODIMENT

Figure 1:
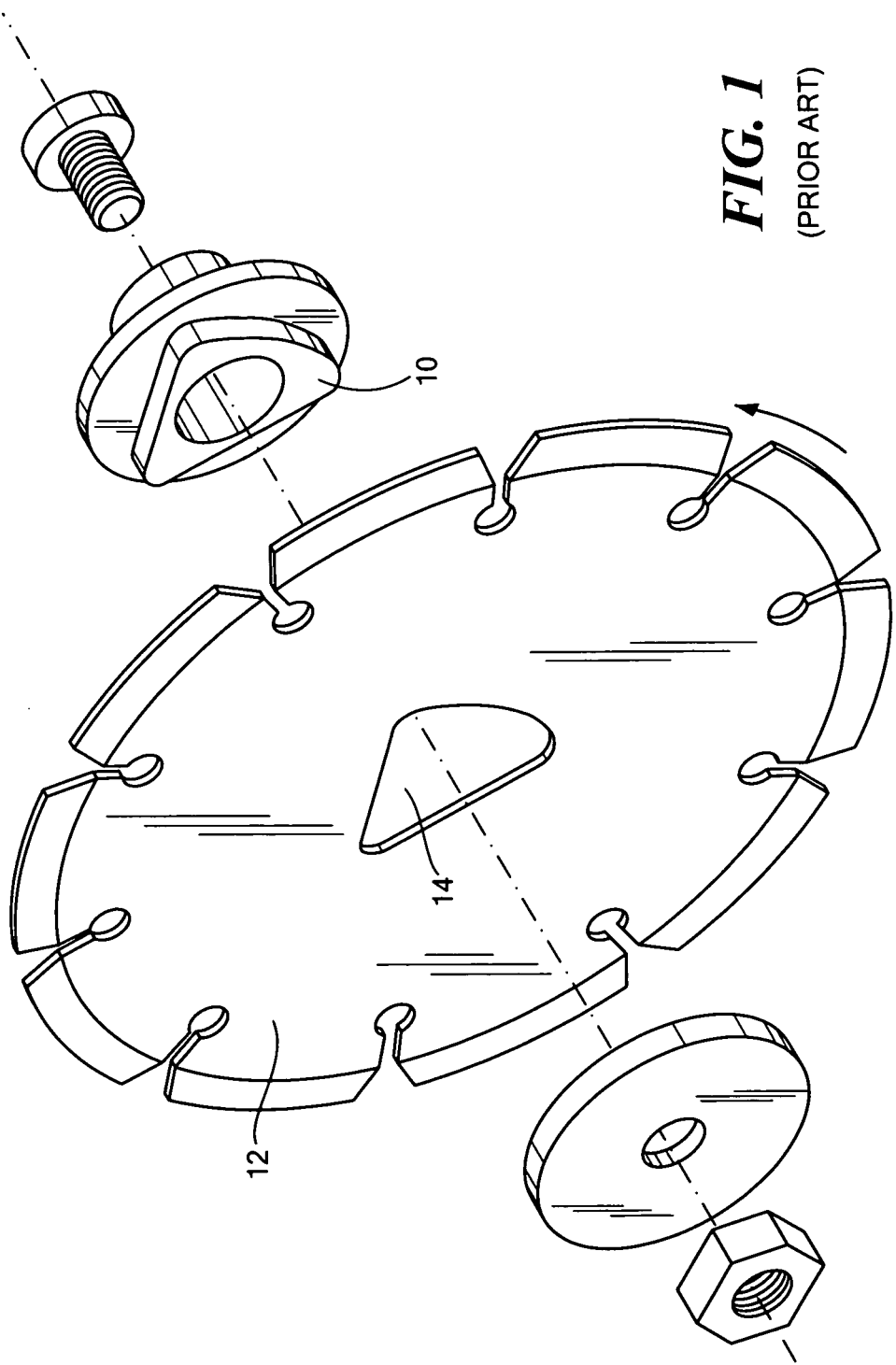
FIG. 1 is a schematic exploded three-dimensional partial view of a prior art saw blade and arbor assembly.

Aside from the preferred embodiment or embodiments disclosed below, this invention is capable of other embodiments and of being practiced or being carried out in various ways. Thus, it is to be understood that the invention is not limited in its application to the details of construction and the arrangements of components set fourth in the following description or illustrated in the drawings. If only one embodiment is described herein, the claims hereof are not to be limited to that embodiment. Moreover, the claims hereof are not to be read restrictively unless there is clear and convincing evidence manifesting a certain exclusion, restriction, or disclaimer.

Figure 2:
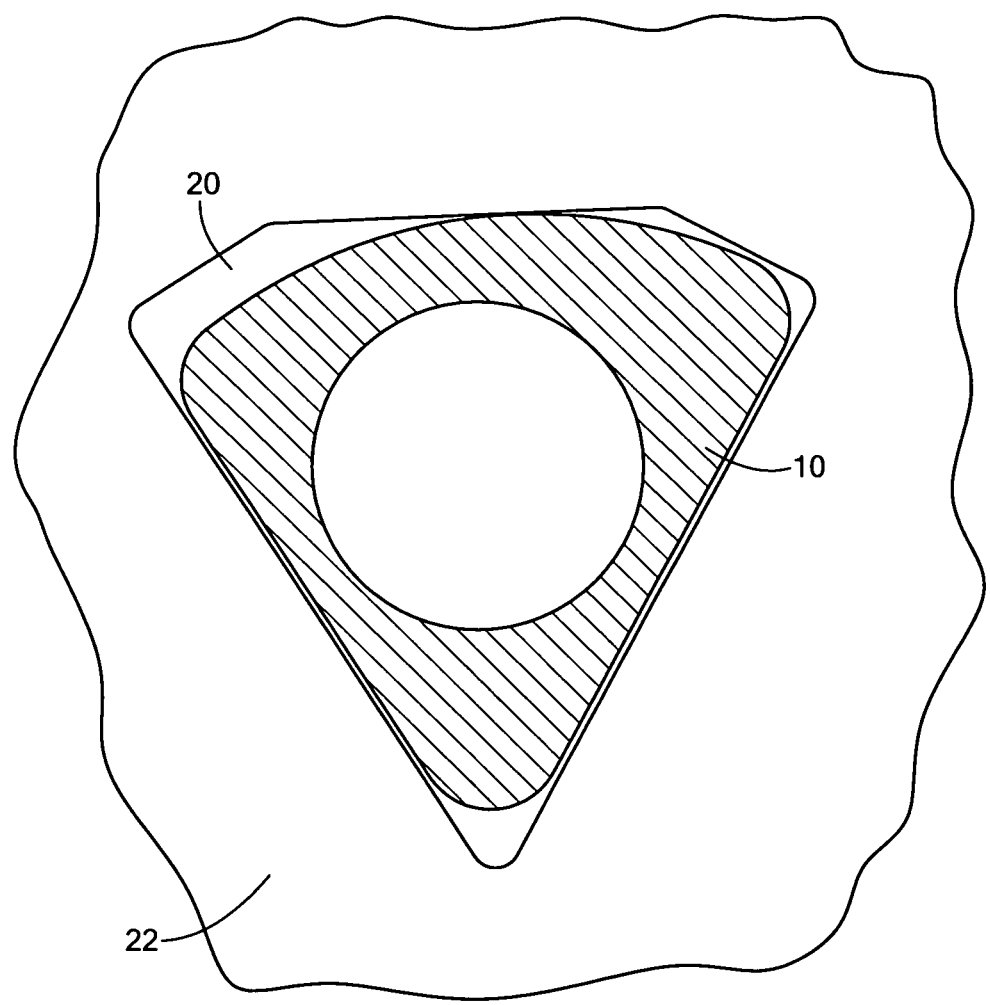
FIG. 2 is a schematic front view showing a portion of a prior art saw blade with a "cut gem" arbor hole mounted to a conventional three-sided arbor.

FIG. 1 shows three-sided arbor 10 and also blade 12 with arbor hole 14 configured the same as arbor 10 in accordance with U.S. Pat. No. 5,603,310. FIG. 2 shows "cut gem" configuration arbor hole 20 in blade 22 mounted on arbor 10 in accordance with U.S. Pat. No. 6,651,644.

Figure 3:
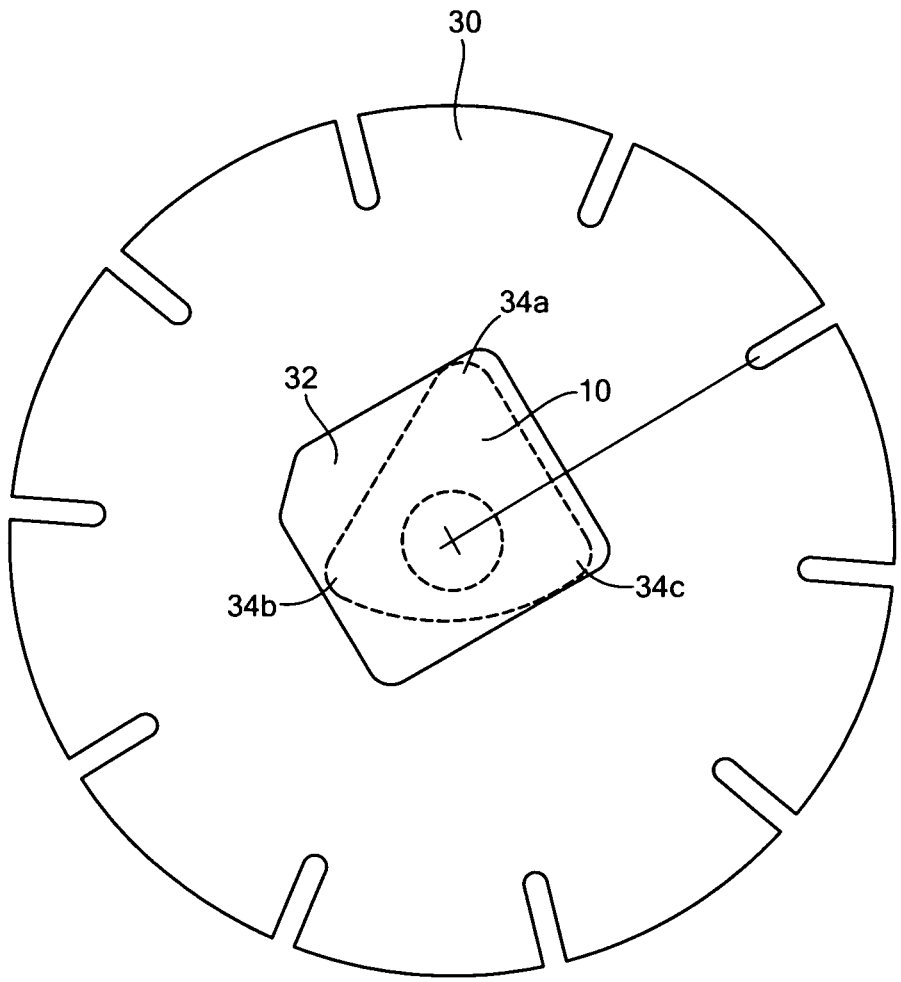
FIG. 3 is a schematic front view showing the applicant's prior saw blade with an arbor hole of a different configuration also useful in connection with three-sided arbor.

The applicant's prior saw blade 30 is shown in FIG. 3 and includes arbor hole 32 for arbor 10 shown in phantom. As discussed in the Background section above, one saw manufacturer has now reconfigured arbor 10 to include under cuts at corners 34a, 34b, and 34c so blade 30 cannot be properly secured to this reconfigured arbor.

Figure 4:
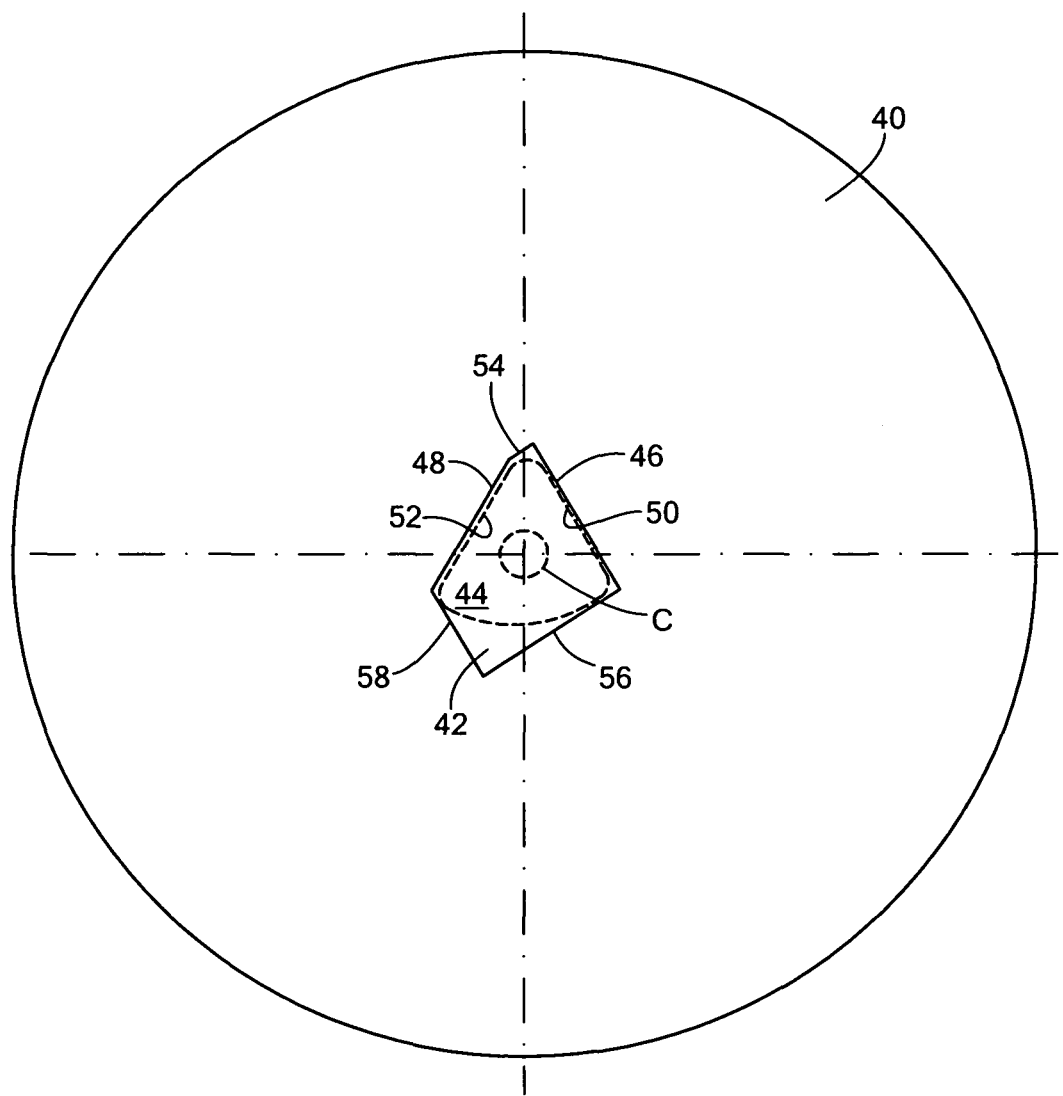
FIG. 4 is a schematic front view of a rotating blade in accordance with the subject invention for a cutting machine typically for use with an arbor having at least three sides.

Blade 40, FIG. 4, in accordance with this invention, with new arbor mounting hole 42, in contrast, can be used with a typical prior three-sided arbor 44 shown in phantom, with a reconfigured three-sided arbor, and also with other arbor configurations.

In the preferred embodiment, first side 46 and second side 48 of arbor hole 42 are closely adjacent each other as shown, separated only by short side 54, and thus sides 46 and 48 conform to adjacent sides 50 and 52 of arbor 44, respectively. Short side 54 of arbor mounting hole 42 joins adjacent first and second sides 46 and 48. Third side 56 is connected to first side 46 and fourth side 58 connects third side 56 to second side 48.

Unlike prior arbor hole 14, FIG. 1, new arbor hole 42, FIG. 4 preferably has five straight sides. Unlike prior arbor hole 20, FIG. 2, new arbor hole 42, FIG. 4 has short side 54 joining adjacent first 46 and second 48 sides which conform to adjacent sides 50 and 52 of arbor 44. Unlike the applicant's prior arbor hole 32, FIG. 3, new arbor hole 42, FIG. 4 has two sides 46 and 48 which conform to sides 50 and 52 of arbor 44.

Thus, arbor hole 42 is significantly different than prior arbor holes and yet also operable with a traditional three-sided arbor, a modified three-sided arbor, and arbors of other configurations providing users with another source of replacement blades.

In the preferred embodiment, all sides 46, 48, 54, 56, and 58 are straight and connected together by non-radiused corners as shown in FIG. 4. First side 46 preferably is paralleled to fourth side 58 and short side 54 is paralleled to third side 56. First side 46 is typically perpendicular to short side 54 and to third side 56, and fourth side 58 is perpendicular to third side 56. First side 46, second side 48, and third side 56 are typically approximately the same length and longer than fourth side 58 which is usually at least twice as long as short side 54.

In one example, the center of blade 40 was at location C, first side 46 was 1.601" long, second side 48 was 1.537", third side 56 was 1.601", fourth side 58 was 0.899", and short side 54 was 0.280".

In other embodiments, however, these exemplary dimensions may change, short side 54 and/or fourth side 58 may be configured differently than as shown in FIG. 4, any or all of the sides may be angled, and/or the corners of arbor hole 42 rounded.

Thus, although specific features of the invention are shown in some drawings and not in others, this is for convenience only as each feature may be combined with any or all of the other features in accordance with the invention. Also, the words "including", "comprising", "having", and "with" as used herein are to be interpreted broadly and comprehensively and are not limited to any physical interconnection. Moreover, any embodiments disclosed in the subject application are not to be taken as the only possible embodiments.

Other embodiments will occur to those skilled in the art and are within the following claims.

In addition, any amendment presented during the prosecution of the patent application for this patent is not a disclaimer of any claim element presented in the application as filed: those skilled in the art cannot reasonably be expected to draft a claim that would literally encompass all possible equivalents, many equivalents will be unforeseeable at the time of the amendment and are beyond a fair interpretation of what is to be surrendered (if anything), the rationale underlying the amendment may bear no more than a tangential relation to many equivalents, and/or there are many other reasons the applicant can not be expected to describe certain insubstantial substitutes for any claim element amended.

What is claimed is:

1. A rotating blade for a cutting machine, the blade defining an arbor hole for an arbor having at least three sides, the arbor hole comprising:
    closely proximate first and second sides each of which conform along their entire lengths to directly contact adjacent sides of the arbor having at least three sides;
    a short side having a length shorter than one of the lengths of the first and second sides, the short side directly joining the first and second sides;
    a third side directly connected to the first side;
    a fourth side directly connecting the third side to the second side;
    the first side parallel to the fourth side; and
    the short side parallel to the third side.

2. The arbor hole of claim 1 in which all of the sides are straight.

3. The arbor hole of claim 1 in which all of the sides are connected together by non-radius corners.

4. The arbor hole of claim 1 in which the first and third sides are the same or approximately the same length.

5. The arbor hole of claim 1 in which the first, second, and third sides are the same or approximately the same length.

6. The arbor hole of claim 1 in which the fourth side is at least twice as long as the short side.

7. The arbor hole of claim 1 in which the first, second, and third sides are longer than the fourth side, which is longer than the short side.

* * * * *